US009732828B2

United States Patent
Park et al.

(10) Patent No.: US 9,732,828 B2
(45) Date of Patent: Aug. 15, 2017

(54) ROTATIONAL DRIVE APPARATUS FOR TRANSMITTING ROTATIONAL FORCE TO A PLURALITY OF DRIVEN GEARS

(71) Applicant: SAMSUNG ELECTRONICS CO., LTD., Suwon-si, Gyeonggi-do (KR)

(72) Inventors: Ki-ho Park, Seoul (KR); Sung-dae Kim, Suwon-si (KR)

(73) Assignee: S-PRINTING SOLUTION CO., LTD., Suwon-si (KR)

( * ) Notice: Subject to any disclaimer, the term of this patent is extended or adjusted under 35 U.S.C. 154(b) by 0 days.

(21) Appl. No.: 14/709,855

(22) Filed: May 12, 2015

(65) Prior Publication Data

US 2016/0053857 A1 Feb. 25, 2016

(30) Foreign Application Priority Data

Aug. 20, 2014 (KR) .................. 10-2014-0108471

(51) Int. Cl.
| | |
|---|---|
| G03G 15/00 | (2006.01) |
| F16H 1/20 | (2006.01) |
| F16H 57/00 | (2012.01) |

(52) U.S. Cl.
CPC .............. *F16H 1/20* (2013.01); *F16H 57/00* (2013.01); *F16H 57/0006* (2013.01); *G03G 15/757* (2013.01); *G03G 2221/1657* (2013.01)

(58) Field of Classification Search
None
See application file for complete search history.

(56) References Cited

U.S. PATENT DOCUMENTS

| | | | | |
|---|---|---|---|---|
| 6,704,529 B2 * | 3/2004 | Noh | .................. | G03G 15/0896 399/167 |
| 2008/0087121 A1 * | 4/2008 | Na | ........................... | F16H 1/20 74/412 R |
| 2008/0196530 A1 * | 8/2008 | Shimada | .................. | F16H 1/20 74/457 |
| 2008/0226345 A1 * | 9/2008 | Yoon | .................. | G03G 21/1676 399/167 |
| 2008/0271556 A1 * | 11/2008 | Imamura | ........... | F16H 57/02004 74/412 R |
| 2009/0028589 A1 * | 1/2009 | Kim | ..................... | G03G 15/757 399/39 |
| 2010/0061763 A1 * | 3/2010 | Kim | .................. | G03G 15/6511 399/167 |
| 2011/0064471 A1 * | 3/2011 | Kim | ..................... | G03G 15/757 399/167 |
| 2011/0089795 A1 * | 4/2011 | Yoon | .................. | G03G 21/1633 312/319.7 |

FOREIGN PATENT DOCUMENTS

JP 2004100828 A * 4/2004

\* cited by examiner

*Primary Examiner* — David M Gray
*Assistant Examiner* — Geoffrey T Evans
(74) *Attorney, Agent, or Firm* — Staas & Halsey LLP

(57) ABSTRACT

A power transmission apparatus includes a drive gear disposed on a shaft of a motor; a plurality of driven gears disposed to be engaged with the drive gear; and a plurality of driven members configured to receive power from each of the plurality of driven gears, wherein the plurality of driven gears is arranged so that, when the plurality of driven gears are engaged with the drive gear, a gear engagement phase of each of the plurality of driven gears is different.

19 Claims, 17 Drawing Sheets

ROTATIONAL DRIVE APPARATUS FOR TRANSMITTING ROTATIONAL FORCE TO A PLURALITY OF DRIVEN GEARS

CROSS-REFERENCE TO RELATED APPLICATIONS

This application claims priority from Korean Patent Application No. 10-2014-0108471 filed Aug. 20, 2014 in the Korean Intellectual Property Office, the disclosure of which is incorporated herein by reference in its entirety.

BACKGROUND

1. Field

The present disclosure relates to a power transmission apparatus for driving a plurality of driven gears by a single drive gear. More particularly, the present disclosure relates to an arrangement of a drive gear and a plurality of driven gears engaged with the drive gear that can reduce vibration of a power transmission apparatus.

2. Description of the Related Art

For cost reduction, a power transmission apparatus used in an image forming apparatus may be configured for one driving source to drive a plurality of driven members. In such a case, a drive gear disposed at the one driving source is formed to rotate a plurality of driven gears connected to the plurality of driven members.

FIG. 1 illustrates a case in which a single drive gear 1 is engaged with two driven gears 5 and 6. The drive gear 1 is fixed to a shaft 3 of a motor that is a driving source, and the top and bottom of the drive gear 1 are meshed with first and second driven gears 5 and 6. The first and second driven gears 5 and 6 are connected to first and second driven members (not illustrated), respectively. Accordingly, when the drive gear 1 rotates, the first and second driven gears 5 and 6 are rotated to transmit power to the first and second driven members.

For example, as illustrated in FIG. 1, if the number of teeth of the drive gear 1 is ten (10), the number of the driven gears 5 and 6 meshed with the drive gear 1 is two (2), and an installation angle between the two driven gears 5 and 6 is approximately 180 degrees, P is an integer.

Here, P is defined as Z/N (namely, P=Z/N).

Z is the number of teeth of the drive gear 1. In the case of FIG. 1, Z is ten (10). N is the number of the plurality of driven gears 5 and 6. In the case of FIG. 1, N is two (2). Accordingly, P=10/2=5 so that P is an integer.

As illustrated in FIG. 1, if the installation angle between the two driven gears 5 and 6 is approximately 180 degrees and P is an integer, when each of the first driven gear 5 and the second driven gear 6 are engaged with the drive gear 1, gear engagement is generated at the same phase so that the gear engagement phases are superimposed. Thus, if the gear engagement phases are superimposed, a lateral force is small, but transmission error increases so that a torsional force acts significantly in a rotation direction of the gear. Here, the transmission error refers to difference between a theoretical position of a gear and an actual position of the gear, and is generated by the design and manufacturing errors of the gears and transformation of the gears when the gears are engaged with each other. FIG. 2 is a graph showing that the transmission error is increased when the gear engagement phases are superimposed. From FIG. 2, it can be seen that the transmission error is increased when the gear engagement phases are overlapped.

The transmission error of the gear is a cause of an excitation force for generating vibration, and the excitation force induces the structural vibration of an entire apparatus in which the drive gear and a plurality of driven gears are installed. Accordingly, when the transmission error of gears in the power transmission apparatus of the image forming apparatus is large, jitter occurs, thereby adversely affecting images formed by the image forming apparatus.

SUMMARY

The present disclosure has been developed in order to overcome the above drawbacks and other problems associated with the conventional arrangement. An aspect of the present disclosure is to provide a power transmission apparatus which is configured so that gear engagement phases are not overlapped.

The above aspect and/or other feature of the present disclosure can substantially be achieved by providing a power transmission apparatus, which may include a drive gear disposed on a shaft of a motor; a plurality of driven gears disposed to be engaged with the drive gear; and a plurality of driven members configured to receive power from each of the plurality of driven gears, wherein the plurality of driven gears is arranged so that, when the plurality of driven gears are engaged with the drive gear 11, a gear engagement phase of each of the plurality of driven gears is different.

When $$P = \frac{\text{the number of teeth of drive gear } (Z)}{\text{the number of driven gears } (N)},$$

then P may not be an integer.

When an interval between the plurality of driven gears is referred to as φ, φ=360°/N, wherein, N is an integer as a number of the plurality of driven gears.

When an interval between the plurality of driven gears is referred to as φ, φ=360°/N±360°/Z, wherein, N is an integer as a number of the plurality of driven gears, and Z is an integer as a number of teeth of the drive gear.

A phase of a first gear of the plurality of driven gears may not be zero degrees.

When $$Q = \frac{(Z+1)}{n}, \text{ and } R = \frac{(Z-1)}{N},$$

if N is three, then Q may not be an integer.

When $$Q = \frac{(Z+1)}{n}, \text{ and } R = \frac{(Z-1)}{N},$$

if N is three, then R may not be an integer.

When $$Q = \frac{(Z+1)}{n}, \text{ and } R = \frac{(Z-1)}{N},$$

if N is four or more, then Q and R may not be integers.

When $$Q = \frac{(Z+1)}{n}, \text{ and } R = \frac{(Z-1)}{N},$$

if N is three, then Q may not be an integer.
When $$Q = \frac{(Z+1)}{n}, \text{ and } R = \frac{(Z-1)}{N},$$

if N is three, then R may not be an integer.
When $$Q = \frac{(Z+1)}{n}, \text{ and } R = \frac{(Z-1)}{N},$$

if N is four or more, then Q and R may not be integers.

The plurality of driven gears may be disposed at different intervals.

When an interval between the plurality of driven gears is referred to as $\phi$, $\phi=360°/N\pm360°/Z$, wherein, the N is an integer as a number of the plurality of driven gears, and the Z is an integer as a number of teeth of the drive gear.

The power transmission apparatus may be used in an image forming apparatus, and the plurality of driven gears may include a photosensitive drum gear and a pickup gear.

The plurality of driven members may include a photosensitive drum and a pickup roller.

Other objects, advantages and salient features of the present disclosure will become apparent from the following detailed description, which, taken in conjunction with the annexed drawings, discloses preferred embodiments.

BRIEF DESCRIPTION OF THE DRAWINGS

These and/or other aspects and advantages of the present disclosure will become apparent and more readily appreciated from the following description of the embodiments, taken in conjunction with the accompanying drawings of which.

Throughout the drawings, like reference numerals will be understood to refer to like parts, components and structures.

DETAILED DESCRIPTION OF THE PREFERRED EMBODIMENTS

Hereinafter, certain exemplary embodiments of the present disclosure will be described in detail with reference to the accompanying drawings.

The matters defined herein, such as a detailed construction and elements thereof, are provided to assist in a comprehensive understanding of this description. Thus, it is apparent that exemplary embodiments may be carried out without those defined matters. Also, well-known functions or constructions are omitted to provide a clear and concise description of exemplary embodiments. Further, dimensions of various elements in the accompanying drawings may be arbitrarily increased or decreased for assisting in a comprehensive understanding.

Since a transmission error occurring in a conventional power transmission apparatus becomes large when gear engagement phases of a plurality of driven gears are overlapped, if the power transmission apparatus is formed so that the gear engagement phases are not overlapped, the transmission error may be reduced. Accordingly, in the power transmission apparatus in which one drive gear drives a plurality of driven gears, it is necessary to prevent the gear engagement phases of the plurality of driven gears from being overlapped.

Figure 3:
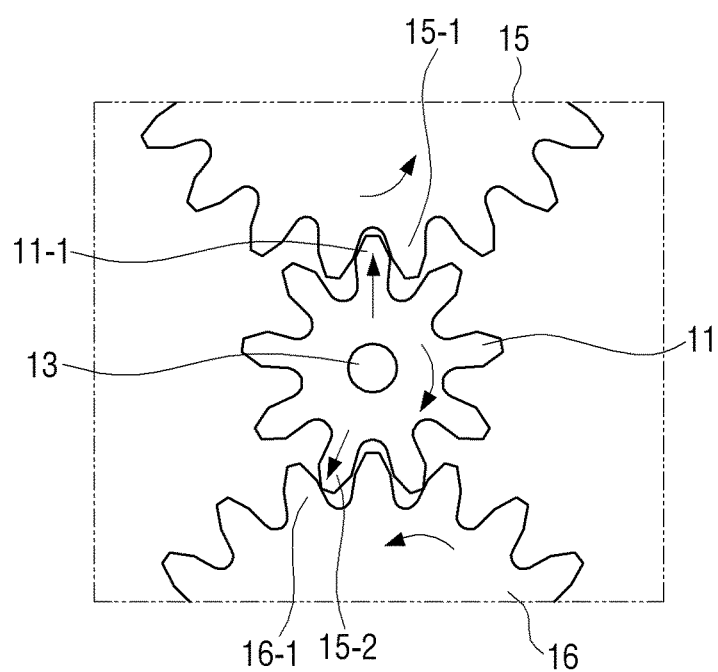
FIG. 3 is a view illustrating a state in which a drive gear and driven gears are meshed with each other in a power transmission apparatus according to an embodiment of the present disclosure.
Figure 4:
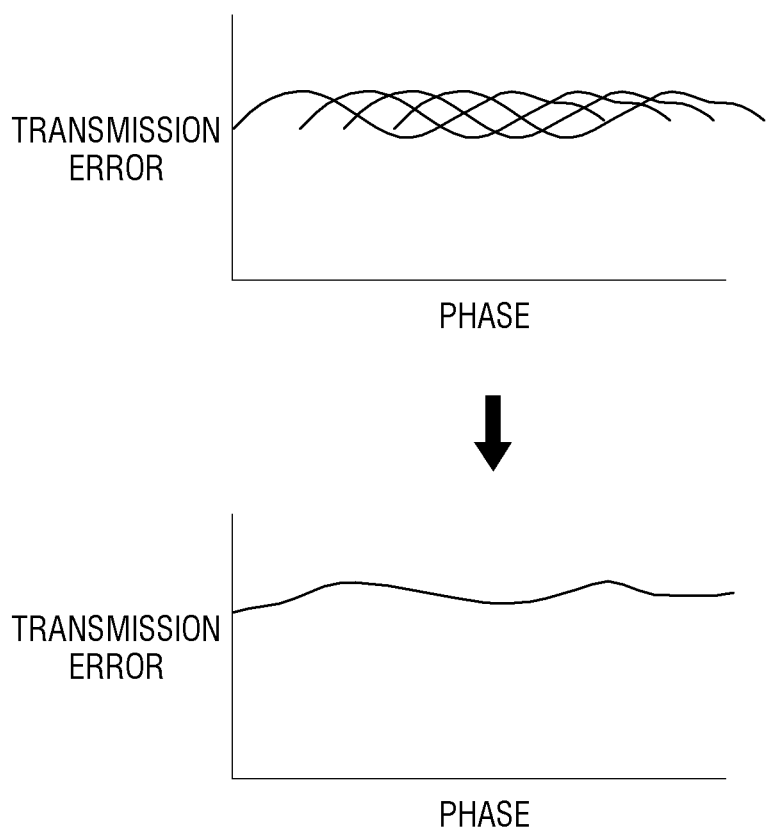
FIG. 4 is a graph illustrating a power transmission error occurring in the power transmission apparatus having a gear arrangement as illustrated in FIG. 3.

FIG. 3 is a view illustrating a state in which gear engagement phases of two driven gears meshed with a drive gear are not overlapped, and FIG. 4 is a graph illustrating a transmission error of a gear occurring in the power transmission apparatus having a gear arrangement as illustrated in FIG. 3.

Figure 1:
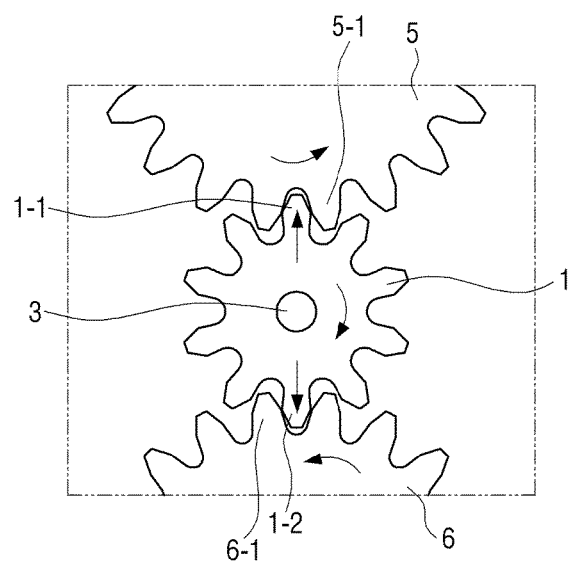
FIG. 1 is a view illustrating a state in which a drive gear and driven gears are meshed with each other in a conventional power transmission apparatus.
Figure 2:
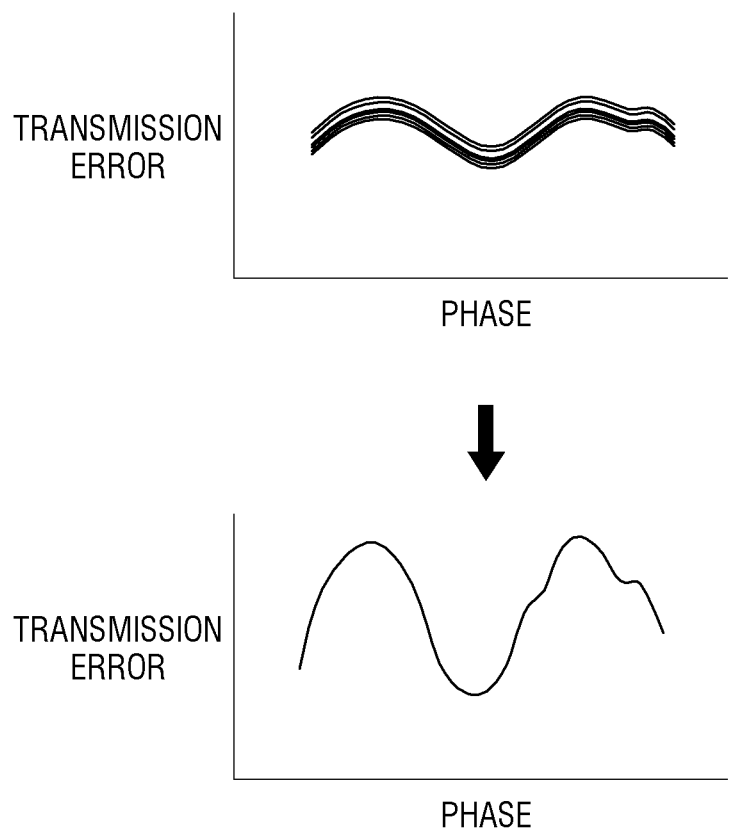
FIG. 2 is a graph illustrating a power transmission error occurring in the power transmission apparatus having a gear arrangement as illustrated in FIG. 1.

In a case in which two driven gears 15 and 16 are disposed so that gear engagement phases thereof are not overlapped as illustrated in FIG. 3, when a tooth of each of the two driven gears 15 and 16 is meshed with teeth of a drive gear 11, meshing positions are different from each other. For example, when a tooth 11-1 of the drive gear 11 starts to contact a tooth 15-1 of a first driven gear 15, a tooth 16-1 of a second driven gear 16 may start to be separated from a tooth 15-2 of the drive gear 11. In other words, the gear engagement phases of the first driven gear 15 and the second driven gear 16 are different from each other. However, in a case in which the gear engagement phases of the two driven gears 5 and 6 are overlapped with each other as illustrated in FIG. 1, positions in which the tooth of each of the two driven gears 5 and 6 is meshed with the teeth of the drive gear 1 are the same. For example, when a tooth 5-1 of the first driven gear 5 starts to contact a tooth 1-1 of the drive gear 1, a tooth 6-1 of the second driven gear 6 also starts to contact a tooth 1-2 of the drive gear 1.

When the gear engagement phases of the two driven gears 15 and 16 are not overlapped, as illustrated in FIG. 4, the transmission error of the gear is dispersed so that a torsional force is reduced.

When one drive gear drives a plurality of driven gears in the power transmission apparatus, the number of teeth of the drive gear may be adjusted depending on the number of the plurality of driven gears in order to prevent gear engagement phases of the plurality of driven gears from being overlapped with each other. This will be described with reference to FIGS. 5 and 6.

Figure 5:
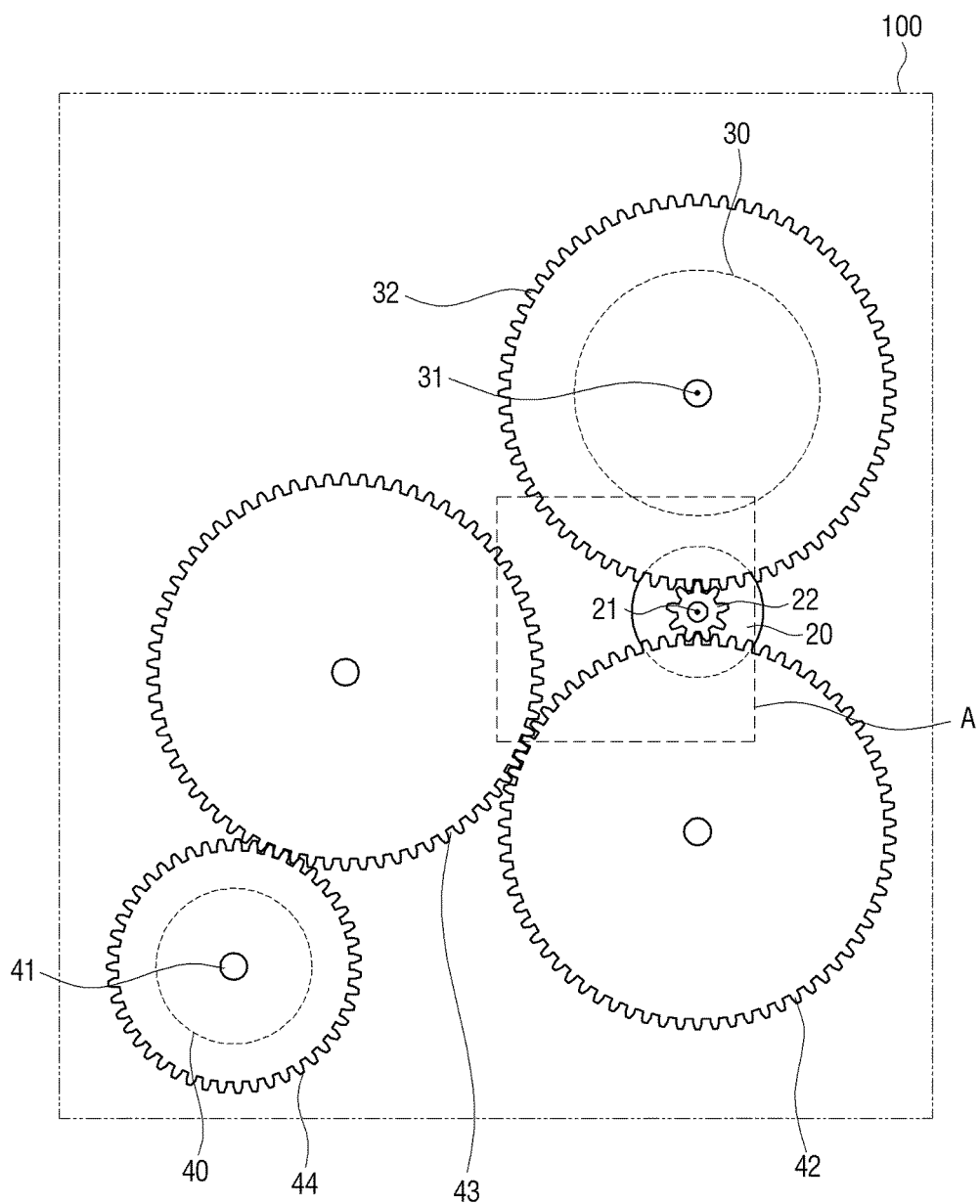
FIG. 5 is a view illustrating a part of an image forming apparatus to which a power transmission apparatus according to an embodiment of the present disclosure is applied.
Figure 6:
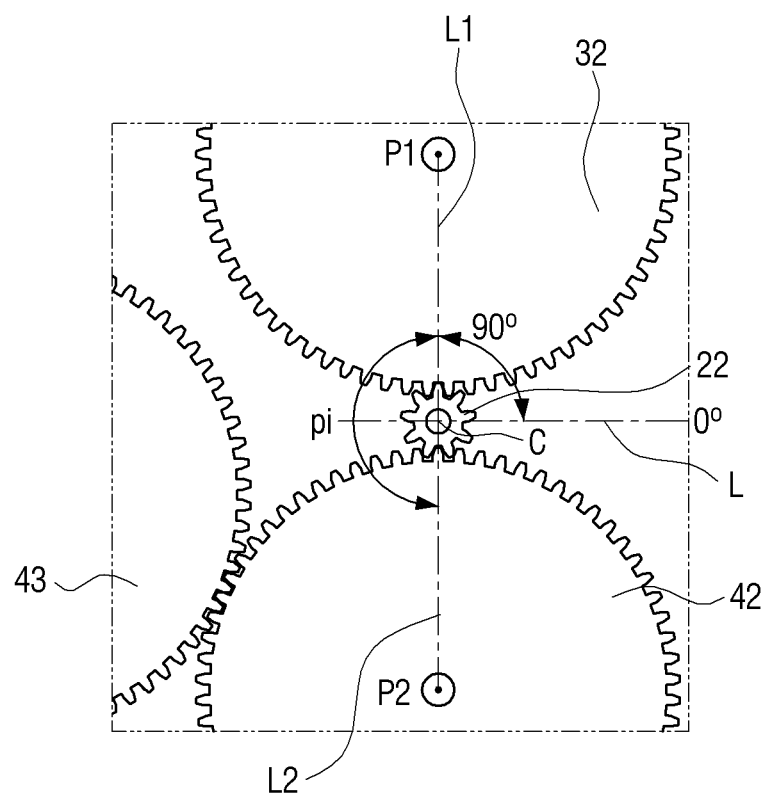
FIG. 6 is an enlarged view illustrating an A portion in FIG. 5.

FIG. 5 is a view illustrating a part of an image forming apparatus 100 to which a power transmission apparatus according to an embodiment of the present disclosure is applied. FIG. 6 is an enlarged view illustrating an A portion in FIG. 5, and illustrates a state in which a photosensitive drum gear 32 and a first transmission gear 42 for a pickup roller are engaged with a pinion gear 22. The pinion gear 22 is a drive gear that is disposed on a shaft 21 of a motor 20, and the photosensitive drum gear 32 and the first transmission gear 42 for a pickup roller are driven gears.

Referring to FIG. 5, the photosensitive drum gear 32 is disposed coaxially on a shaft 31 of a photosensitive drum 30. Accordingly, when the photosensitive drum gear 32 is rotated by the pinion gear 22, the photosensitive drum 30 is rotated integrally with the photosensitive drum gear 32. As another example, although not illustrated, the photosensitive drum gear 32 is not directly connected to the pinion gear 22, but is connected to the pinion gear 22 by disposing at least one transmission gear or idle gear between the pinion gear 22 and the photosensitive drum gear 32. The first transmission gear 42 for a pickup roller is connected to a second transmission gear 43, and the second transmission gear 43 is connected to a pickup roller gear 44 which is disposed coaxially in a pickup roller 40. Accordingly, when the first transmission gear 42 for a pickup roller is rotated by the pinion gear 22, the pickup roller 40 is rotated. In FIG. 5, the power transmission apparatus is configured so that rotation of the pinion gear 22 is transmitted to the pickup roller 40 through two transmission gears 42 and 43; however, the number of the transmission gears 42 and 43 is not limited to this. The rotation of the pinion gear 22 may be configured to be transmitted to the pickup roller 40 through one or three or more transmission gears.

In the power transmission apparatus as illustrated in FIG. 6, a variable P may be defined by the following formula.

$$P = \frac{\text{the number of teeth of drive gear } (Z)}{\text{the number of driven gears } (N)}$$

Accordingly, the variable P is changed according to the number of teeth of the drive gear 22 and the number of the driven gears 32 and 42.

In FIG. 6, the drive gear 22 is the pinion gear, and the number of teeth of the drive gear Z is nine (9). Also, the driven gears meshed with the pinion gear 22 are the photosensitive drum gear 32 and the first transmission gear 42 for a pickup roller so that the number of the driven gears N is two (2).

As a result, P=9/2=4.5

In FIG. 6, if the right side of a horizontal line L passing through the center C of the pinion gear 22 is defined as 0 degrees, the center P1 of the photosensitive drum gear 32 is disposed at the position of 90 degrees, and the center P2 of the first transmission gear 42 for a pickup roller is disposed at the position of 270 degrees. Accordingly, an angle φ between the two gears 32 and 42 engaged with the pinion gear 22, namely, the photosensitive drum gear 32 and the first transmission gear 42 for a pickup roller is 360°/2, that is, 180°. Here, the angle φ between the photosensitive drum gear 32 and the first transmission gear 42 for a pickup roller (hereinafter, referred to as an installation angle) is referred to as an angle between a straight line L1 connecting the center P1 of the photosensitive drum gear 32 and the center C of the pinion gear 22 and a straight line L2 connecting the center P2 of the first transmission gear 42 for a pickup roller and the center C of the pinion gear 22. Also, the photosensitive drum gear 32 is disposed so that the gear engagement phase λ1 thereof is not zero (0) degrees.

Here, a formula to calculate the installation angle φ between the plurality of driven gears 32 and 42 is the following.

φ=360°/N (here, N is the number of the plurality of driven gears)

For example, if the number of the driven gears is three (3), the installation angle φ of the driven gears is 120 degrees.

In FIG. 6, a rotation angle θ from when one tooth of the pinion gear 22 was in contact with one tooth of the driven gear 32 or 42 until when the one tooth of the pinion gear 22 is separated from the one tooth of the driven gear 32 or 42 is 40 degrees. This can be calculated by dividing 360° by the number of teeth of the pinion gear 22. In other words, θ=360°/9=40°.

Figure 7:
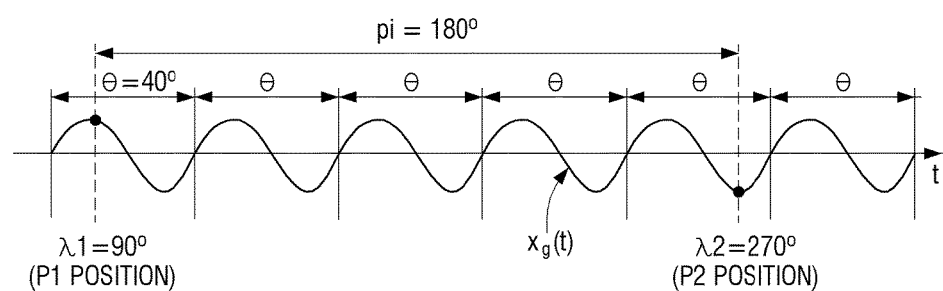
FIG. 7 is a graph illustrating a relationship between installation positions and gear engagement phases of a photosensitive drum gear and a first transmission gear for a pickup roller in the power transmission apparatus of FIG. 5.

FIG. 7 is a graph illustrating a relationship between installation positions and gear engagement phases of the photosensitive drum gear 32 and the first transmission gear 42 for the pickup roller in the power transmission apparatus of FIG. 5.

In FIG. 7, a sine wave $x_g(t)$ represents gear engagement vibration, and θ represents the rotation angle from when the pinion gear 22 is in contact with one tooth of driven gear 32 or 42 until when the pinion gear 22 is separated from the one tooth of driven gear 32 or 42. Also, φ represents the installation angle between the photosensitive drum gear 32 and the first transmission gear 42 for a pickup roller engaged with the pinion gear 22. In FIG. 7, φ is 180°, and θ is 40°.

Referring to the graph of FIG. 7, the gear engagement phase λ1 of the photosensitive drum gear 32 located at the position of P1 is 90 degrees, and the gear engagement phase λ2 of the first transmission gear 42 for a pickup roller which is disposed to be spaced apart by 180 degrees from the photosensitive drum gear 32 based on the pinion gear 22 is 270 degrees. Accordingly, it can be seen that the gear engagement phase λ2 of the first transmission gear 42 for a pickup roller is opposite to the gear engagement phase λ1 of the photosensitive drum gear 32.

Accordingly, when the value of P is not an integer and the installation angle ϕ is 180 degrees as illustrated in FIG. 7, the gear engagement phases λ1 and λ2 of the two driven gears 32 and 42 are not overlapped.

When the gear engagement phases λ1 and λ2 of the two driven gears 32 and 42 engaged with the pinion gear 22 are not overlapped but avoided to the opposite side as described above, the torsional force may be minimized. Therefore, the vibration and image jitter of the image forming apparatus 100 in which the power transmission apparatus according to an embodiment of the present disclosure is disposed may be reduced.

As another example, a method of disposing two driven gears 32 and 42 so that, when the variable P is an integer, the gear engagement phases λ1 and λ2 of the two driven gears 32 and 42 are not overlapped will be described.

In the embodiment of FIG. 5 as described above, if the number of teeth of the pinion gear 22 is ten (10), P=Z/N=10/2=5. Therefore, the variable P is an integer. Also, the installation angle ϕ between the photosensitive drum gear 32 and the first transmission gear 42 for a pickup roller is 180 degrees.

Figure 8:
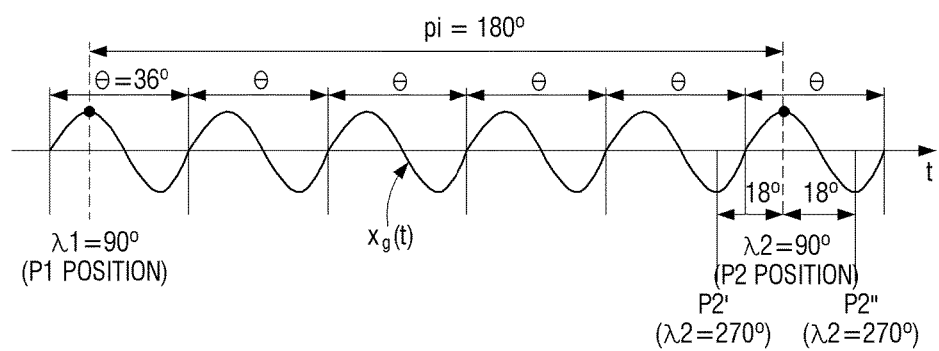
FIG. 8 is a graph illustrating when engagement phases of a photosensitive drum gear and a first transmission gear for a pickup roller are overlapped.

In this case, a graph that represents the gear engagement vibration of the photosensitive drum gear 32 and the first transmission gear 42 for a pickup roller is illustrated in FIG. 8.

In FIG. 8, $x_g(t)$ represents the gear engagement vibration, and the rotation angle θ from when one tooth of the pinion gear 22 is in contact with one tooth of driven gear 32 or 42 until when the one tooth of the pinion gear 22 is separated from the one tooth of driven gear 32 or 42 is 360°/10=36°.

Accordingly, referring to FIG. 8, the gear engagement phase λ1 of the photosensitive drum gear 32 located at the position of P1 is 90 degrees, and the gear engagement phase λ2 of the first transmission gear 42 for the pickup roller which is disposed to be spaced apart by 180 degrees from the photosensitive drum gear 32 based on the pinion gear 22 is 90 degrees. Accordingly, it can be seen that the gear engagement phase λ2 of the first transmission gear 42 for the pickup roller is superimposed with the gear engagement phase λ1 of the photosensitive drum gear 32. In this case, the photosensitive drum gear 32 and the first transmission gear 42 for a pickup roller are engaged at the same time with the pinion gear 22 in the same phase so that the gear vibration and image jitter become large.

In this case, in order to prevent the gear engagement phases λ1 and λ2 of the photosensitive drum gear 32 and the first transmission gear 42 for a pickup roller from being overlapped, the installation angle ϕ of the first transmission gear 42 for a pickup roller may be changed. From FIG. 8, it can be seen that the gear engagement phase λ2 is 270 degrees in a position P2' where the position of P2 is moved by 18 degrees in the left direction or in a position P2" where the position of P2 is moved by 18 degrees in the right direction. Accordingly, if the first transmission gear 42 for a pickup roller is disposed at the position of P2' or P2", the overlapping of the gear engagement phase λ1 of the photosensitive drum gear 32 and the gear engagement phase λ2 of the first transmission gear 42 for a pickup roller may be prevented. At this time, when the first transmission gear 42 for a pickup roller is located at the position of P2', the installation angle ϕ between the photosensitive drum gear 32 and the first transmission gear 42 for a pickup roller engaged with the pinion gear 22 is ϕ=180°−18°=162°. Also, when the first transmission gear 42 for the pickup roller is located at the position of P2", the installation angle ϕ between the photosensitive drum gear 32 and the first transmission gear 42 for a pickup roller is ϕ=180°+18°=198°.

Accordingly, when the variable P is an integer, the photosensitive drum gear 32 and the first transmission gear 42 for a pickup roller are disposed at different intervals by adjusting the installation angle ϕ between the photosensitive drum gear 32 and the first transmission gear 42 for a pickup roller engaged with the pinion gear 22 so that the gear engagement phase λ1 of the photosensitive drum gear 32 is not overlapped with the gear engagement phase λ2 of the first transmission gear 42 for a pickup roller. In detail, even if the variable P is an integer, the gear engagement phases λ1 and λ2 of the photosensitive drum gear 32 and the first transmission gear 42 for a pickup roller may not be overlapped by determining the installation angle ϕ between the photosensitive drum gear 32 and the first transmission gear 42 for a pickup roller as follows.

$$\phi = 360°/N \pm 360°/Z$$

Here, N is a natural number as the number of the plurality of driven gears, and Z is a natural number as the number of teeth of the drive gear. In the above embodiment, the plurality of driven gears is the photosensitive drum gear 32 and the first transmission gear 42 for a pickup roller, and the drive gear is the pinion gear 22.

As another example, because of the structure of an apparatus in which the power transmission apparatus is disposed, the two driven gears may not be disposed so that the installation angle between the two driven gears is 180 degrees. Even in such a case, it is necessary to adjust the installation angle between the two driven gears so that the gear engagement phases of the two driven gears are not overlapped with each other.

Figure 9:
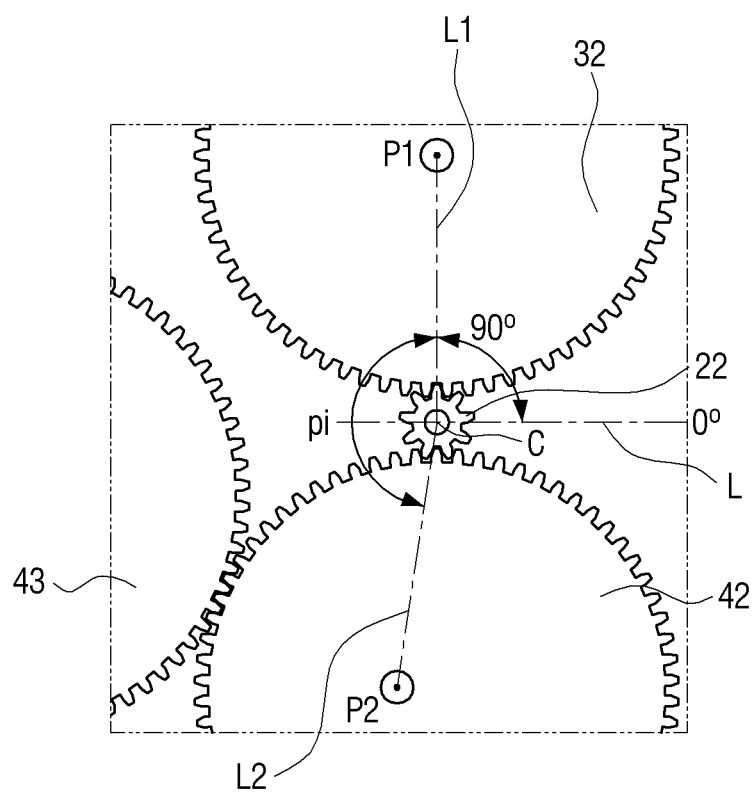
FIG. 9 is a view illustrating a state in which a photosensitive drum gear and a first transmission gear for a pickup roller are engaged with a pinion gear in an image forming apparatus to which a power transmission apparatus according to another embodiment of the present disclosure is applied.

FIG. 9 is a view illustrating a case in which the installation angle ϕ between the photosensitive drum gear 32 and the first transmission gear 42 for the pickup roller engaged with the pinion gear 22 in an image forming apparatus to which a power transmission apparatus according to another embodiment of the present disclosure is applied is not 180 degrees.

In FIG. 9, the drive gear is the pinion gear 22, and the number of teeth of the drive gear Z is nine. Also, since the plurality of driven gears that is engaged with the pinion gear 22 is the photosensitive drum gear 32 and the first transmission gear 42 for a pickup roller, the number of the driven gears N is two (2). Also, in FIG. 9, if the right side of a horizontal line L passing through the center C of the pinion gear 22 is defined as 0 degrees, the center P1 of the photosensitive drum gear 32 is disposed at the position of 90 degrees, and the center P2 of the first transmission gear 42 for a pickup roller is disposed at the position spaced by ϕ apart from P1. At this time, the photosensitive drum gear 32 is disposed so that the gear engagement phase λ1 is not zero (0) degrees.

Accordingly, in the power transmission apparatus of FIG. 9, P=9/2=4.5 so that the variable P is not an integer. As described above, when the value of P is not an integer, if the installation angle ϕ between the photosensitive drum gear 32 and the first transmission gear 42 for a pickup roller is 180 degrees, the gear engagement phases λ1 and λ2 of the photosensitive drum gear 32 and the first transmission gear 42 for a pickup roller are not overlapped with each other. However, in the present embodiment, since the installation angle ϕ between the photosensitive drum gear 32 and the first transmission gear 42 for a pickup roller cannot be determined as 180 degrees due to the design of the power transmission apparatus, it is necessary that the installation angle ϕ is determined to be larger or smaller than 180 degrees.

In the power transmission apparatus of FIG. 9, the rotation angle θ from when one tooth of the pinion gear 22 was in contact with one tooth of the driven gear 32 or 42 until when the one tooth of the pinion gear 22 is separated from the one tooth of the driven gear 32 or 42 is 40 degrees. This can be calculated by dividing 360° by the number of teeth Z of the pinion gear 22. In other words, θ=360°/9=40°.

Figure 10:
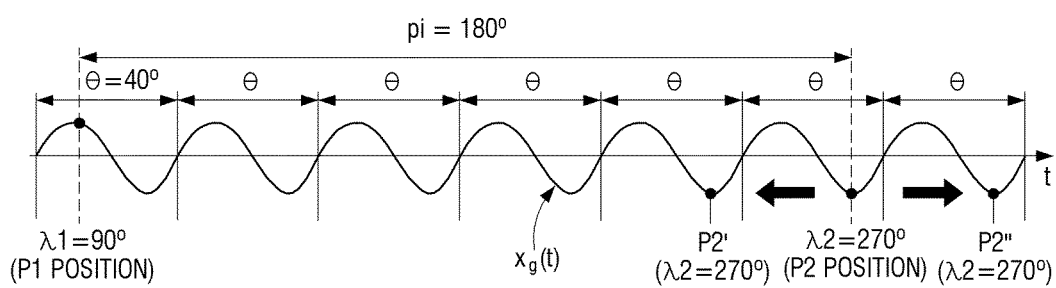
FIG. 10 is a graph illustrating a relationship between installation positions and gear engagement phases of a photosensitive drum gear and a first transmission gear for a pickup roller in the power transmission apparatus of FIG. 9.

FIG. 10 is a graph illustrating a relationship between the installation angle ϕ and the gear engagement phases λ1 and λ2 of the photosensitive drum gear 32 and the first transmission gear 42 for the pickup roller in the power transmission apparatus of FIG. 9. In FIG. 10, a wave $x_g(t)$ represents the gear engagement vibration.

Referring to FIG. 10, it can be seen that the gear engagement phase λ1 of the photosensitive drum gear 32 located at the position of P1 is 90 degrees. Also, if the first transmission gear 42 for a pickup roller is disposed at the position of P2 so that the installation angle ϕ between the photosensitive drum gear 32 and the first transmission gear 42 for a pickup roller is 180 degrees, the gear engagement phase λ2 of the first transmission gear 42 for a pickup roller becomes 270 degrees so that the gear engagement phase λ2 of the first transmission gear 42 for a pickup roller is not overlapped with the gear engagement phase λ1 of the photosensitive drum gear 32.

However, in the present embodiment, since the first transmission gear 42 for a pickup roller cannot be disposed at the position which is spaced by 180 degrees apart from the photosensitive drum gear 32, it is necessary that the first transmission gear 42 for a pickup roller is disposed at another position which is adjacent to the position of P2 and the gear engagement phase λ of which is 270 degrees.

In FIG. 10, the first transmission gear 42 for a pickup roller may be disposed at a position P2' which is moved by 40 degrees in the left direction from the position of P2 or at a position P2" which is moved by 40 degrees in the right direction from the position of P2. In other words, the first transmission gear 42 for a pickup roller may be disposed at the position P2' where the installation angle ϕ of the first transmission gear 42 for a pickup roller is 140 degrees or at the position P2" where the installation angle ϕ of the first transmission gear 42 for a pickup roller is 220 degrees. At this time, if the first transmission gear 42 for a pickup roller is not disposed exactly at the position of P2' or P2", the first transmission gear 42 for a pickup roller may be disposed at a position close to the position of P2' or P2". For example, the first transmission gear 42 for a pickup roller may be disposed at a position close to the position of P2', namely, between 120 degrees to 160 degrees, or at a position close to the position of P2", namely, between 200 degrees to 240 degrees. This position may be determined to minimize the overlapping of the gear engagement phase λ2 of the first transmission gear 42 for a pickup roller and the gear engagement phase λ1 of the photosensitive drum gear 32, and to meet the arrangement limitation of the first transmission gear 42 for a pickup roller and the photosensitive drum gear 32.

The installation angle ϕ between the pluralities of driven gears may be expressed as the following formula.

$$\phi=360°/N \pm 360°/Z$$

Here, ϕ is the installation angle between the driven gears, N is the number of the plurality of driven gears, and Z is the number of teeth of the drive gear.

For example, if the number of the plurality of driven gears is three (3), and the number of teeth of the drive gear is nine (9), ϕ=360°/3±360°/9=120°±40°=160° or 80°.

Accordingly, even if the variable P is not an integer, the gear engagement phases of the plurality of driven gears may not be overlapped with each other and the arrangement limitation of the driven gears may be satisfied by adjusting the installation angle between the pluralities of driven gears engaged with the drive gear.

Hereinafter, in order to verify the effect of the present disclosure, vibration and speed variation rate are measured by changing the degree of overlapping of the gear engagement phases of the plurality of driven gears.

Figure 11:
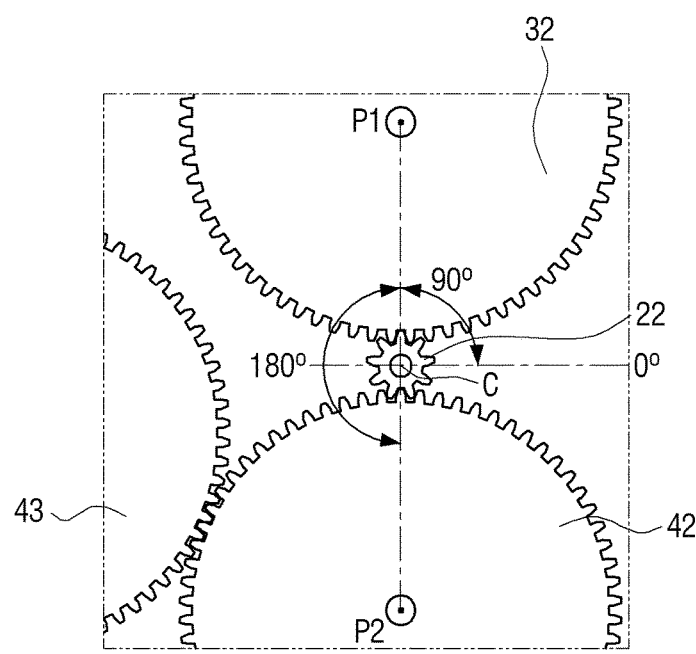
FIGS. 11, 12, and 13 are views illustrating a power transmission apparatus in which an installation angle between two driven gears engaged with a drive gear is different from one another.
Figure 12:
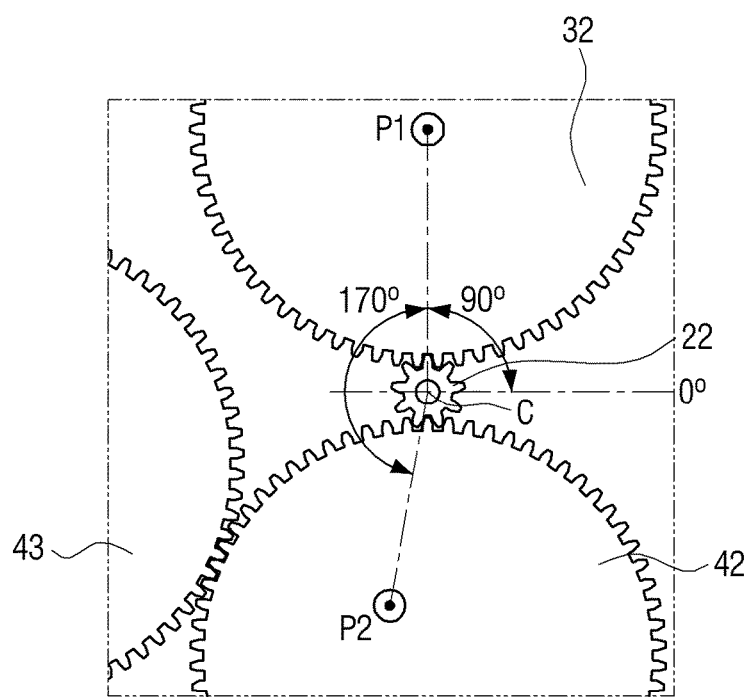
Figure 13:
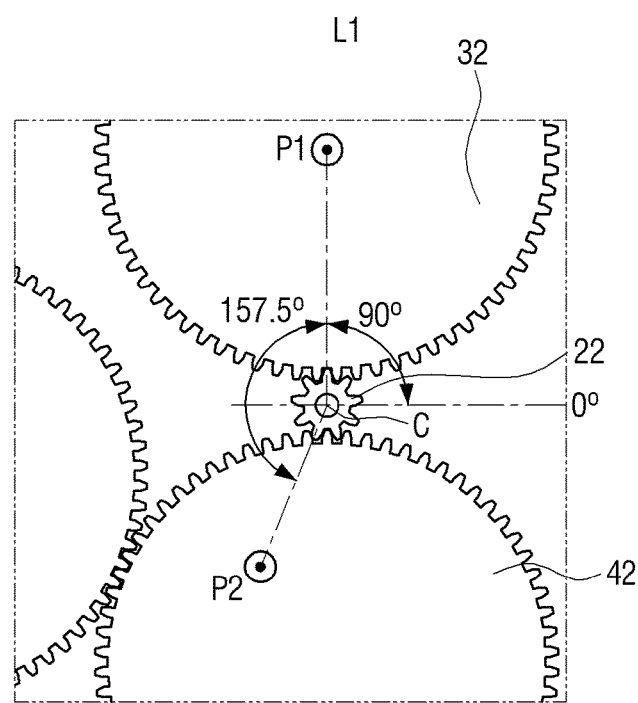

FIGS. 11, 12, and 13 are views illustrating power transmission apparatuses in which an installation angle between two driven gears engaged with a drive gear is different from one another. FIGS. 11, 12, and 13 illustrate a case in which the power transmission apparatus is disposed in an image forming apparatus. Accordingly, the drive gear is the pinion gear 22, and the plurality of driven gears is the photosensitive drum gear 32 and the first transmission gear 42 for a pickup roller.

In FIG. 11, the number of teeth of the pinion gear 22 of the drive gear is nine (9), and the installation angle ϕ between the photosensitive drum gear 32 and the first transmission gear 42 for a pickup roller of the two driven gears is 180 degrees. At this time, the number of teeth of the photosensitive drum gear 32 is 60, and the number of teeth of the first transmission gear 42 for a pickup roller is 73.

In FIG. 12, the number of teeth of the pinion gear 22 of the drive gear is nine (9), and the installation angle ϕ between the photosensitive drum gear 32 and the first transmission gear 42 for a pickup roller of the two driven gears is 170 degrees. At this time, the number of teeth of each of the photosensitive drum gear 32 and the first transmission gear 42 for a pickup roller is 60.

In FIG. 13, the number of teeth of the pinion gear 22 of the drive gear is nine (9), and the installation angle ϕ between the photosensitive drum gear 32 and the first transmission gear 42 for a pickup roller of the two driven gears is 157.5 degrees. At this time, the number of teeth of the photosensitive drum gear 32 is 60, and the number of teeth of the first transmission gear 42 for a pickup roller is 47.

If the case of FIG. 11 is referred to as case 1, the case of FIG. 12 is referred to as case 2, and the case of FIG. 13 is referred to as case 3, the installation angle ϕ and the gear engagement phases λ1 and λ2 of the photosensitive drum gear 32 and the first transmission gear 42 for a pickup roller are calculated as shown in Table 1.

TABLE 1

| division | installation angle (°) | | installation angle difference (°) | Installation phase (λ) | | Phase difference(°) |
| --- | --- | --- | --- | --- | --- | --- |
| | P1 | P2 | (pi = \|P1 − P2\|) | λ1 | λ2 | (λi = \|λ1 − λ2\|) |
| Case 1 | 90 | 270 | 180 | 90 | 270 | 180 |
| Case 2 | 90 | 260 | 170 | 90 | 180 | 90 |
| Case 3 | 90 | 247.5 | 157.5 | 90 | 67.5 | 22.5 |

In Table 1 as described above, case 1 is λ1=90° and λ2=270° so that the gear engagement phases λ1 and λ2 of the photosensitive drum gear 32 and the first transmission gear 42 for a pickup roller are opposed. Case 2 is λ1=90° and λ2=180° so that the gear engagement phases λ1 and λ2 of the photosensitive drum gear 32 and the first transmission gear 42 for a pickup roller are partially overlapped. Case 3 is λ1=90° and λ2=67.5° so that the gear engagement phases λ1 and λ2 of the photosensitive drum gear 32 and the first transmission gear 42 for a pickup roller are the most overlapped.

Figure 14:
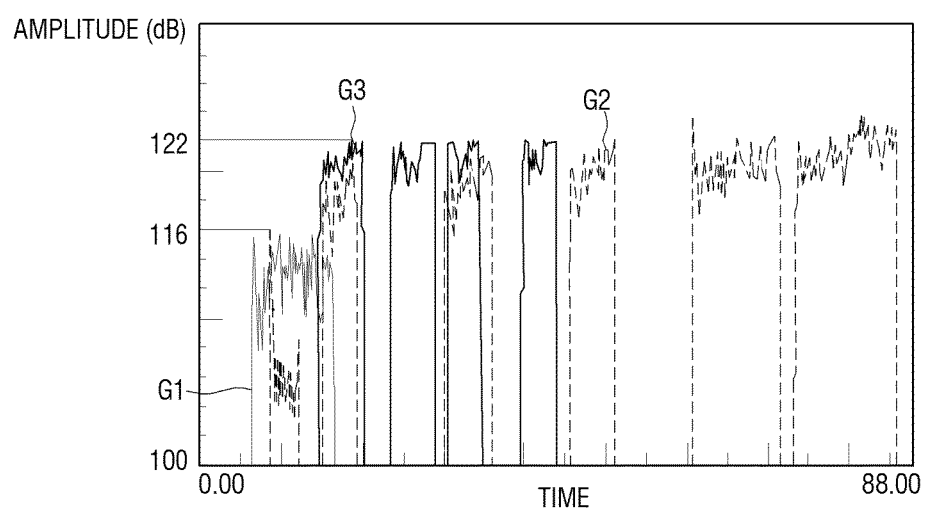
FIG. 14 is a graph illustrating vibration of the power transmission apparatuses having the gear arrangement as illustrated in FIGS. 11, 12, and 13.

FIG. 14 is a graph illustrating vibration of the power transmission apparatuses having the gear arrangement as illustrated in FIGS. 11, 12, and 13. In detail, FIG. 14 illustrates a change in the amplitude of the gear engagement frequency 278.4 Hz of the pinion gear 22 in the above-described case 1, case 2, and case 3. G1 represents the amplitude variation for case 1, G2 represents the amplitude variation for case 2, and G3 represents the amplitude variation for case 3.

Referring to FIG. 14, since the amplitude in case 3 is about 122 dB and the amplitude in case 1 is about 116 dB, it can be seen that the amplitude of case 3 is about 6 dB larger than the amplitude of case 1. This means that the vibration of case 3 is approximately two times greater than the vibration of case 1. It can be seen that case 2 initially has an amplitude similar to case 1, and has an amplitude similar to case 3 according as time passes.

Also, for assessing the extent of the image jitter due to the gear engagement phase difference, the speed variation rate with respect to each of case 1, case 2, and case 3 was measured. If the speed variation rate is large, the image jitter is large, and if the speed variation rate is small, the image jitter is small.

Figure 15:
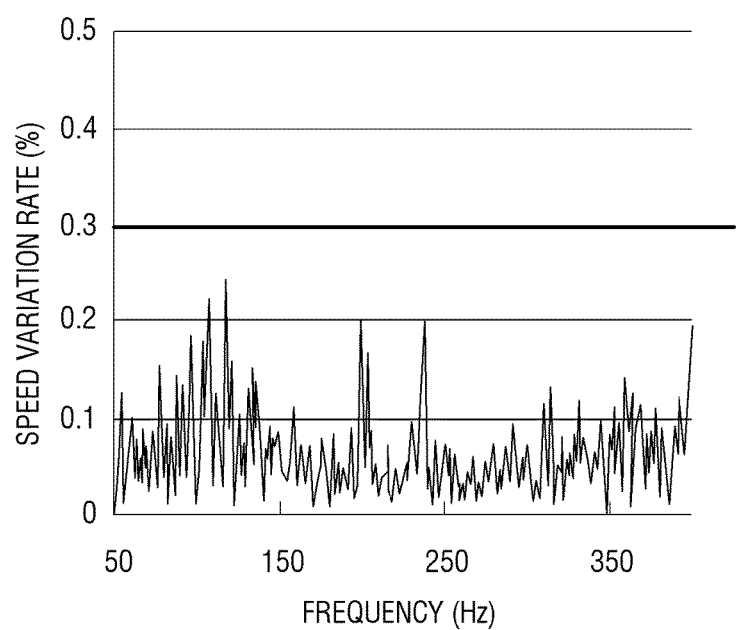
FIG. 15 is a graph illustrating a speed variation rate of the power transmission apparatus having the gear engagement as illustrated in FIG. 11.
Figure 16:
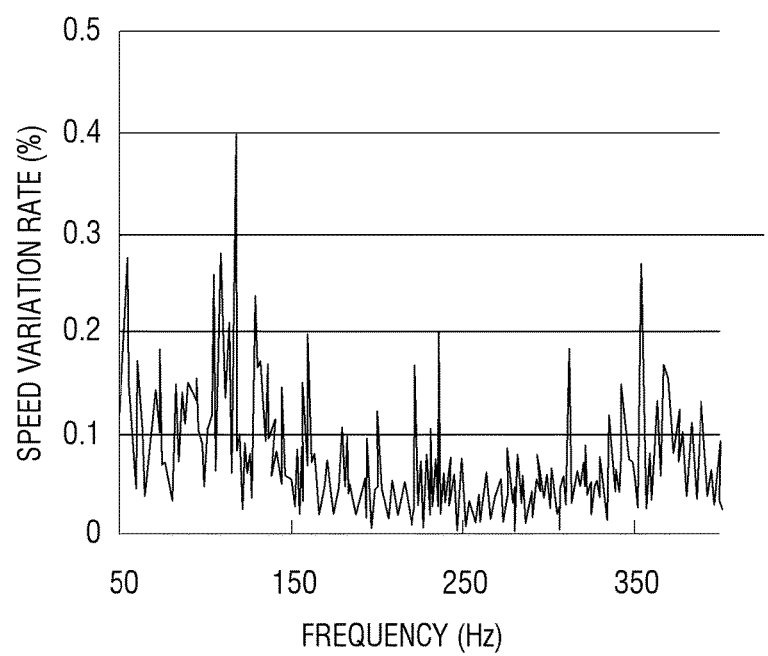
FIG. 16 is a graph illustrating a speed variation rate of the power transmission apparatus having the gear engagement as illustrated in FIG. 12.
Figure 17:
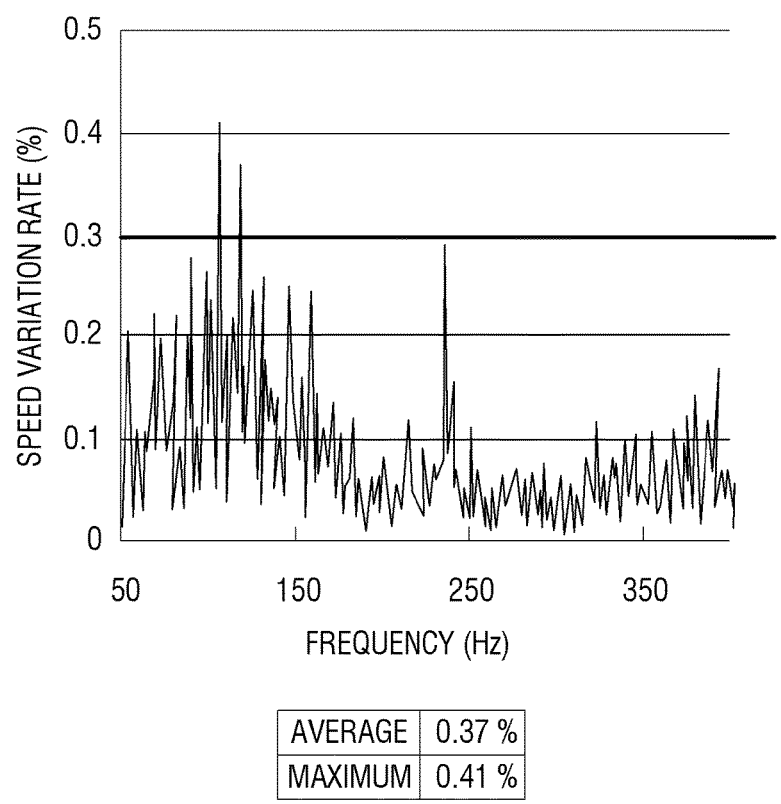
FIG. 17 is a graph illustrating a speed variation rate of the power transmission apparatus having the gear engagement as illustrated in FIG. 13.

FIG. 15 is a graph illustrating a speed variation rate of the power transmission apparatus of case 1 having the gear engagement as illustrated in FIG. 11. FIG. 16 is a graph illustrating a speed variation rate of the power transmission apparatus of case 2 having the gear engagement as illustrated in FIG. 12, and FIG. 17 is a graph illustrating a speed variation rate of the power transmission apparatus of case 3 having the gear engagement as illustrated in FIG. 13.

Referring to FIG. 15, in case 1 having the largest gear engagement phase difference of 180 degrees, the average speed variation rate is 0.25%, and the maximum speed variation rate is 0.28%. Referring to FIG. 16, in case 2 having the gear engagement phase difference of 90 degrees, the average speed variation rate is 0.37%, and the maximum speed variation rate is 0.40%. Also, referring to FIG. 17, in case 3 having the gear engagement phase difference of 22.5 degrees, the average speed variation rate is 0.37%, and the maximum speed variation rate is 0.41%. Accordingly, since case 1 has the lowest speed variation rate, it can be seen that the image jitter in case 1 is smallest.

In the above description, how to prevent the gear engagement phases from being overlapped on the gear engagement frequency of the drive gear is described. However, the method to prevent the gear engagement phases from being overlapped according to an embodiment of the present disclosure as described above may be applied to reduce sideband components as well as to the gear engagement frequency.

Here, the sideband is generated when the amplitude of the vibration signal that is measured when a drive rotation shaft transmits power to another branched rotation shaft is not constant and is periodically distorted (or modulated). The period and magnitude of the modulation amplitude are referred to as components of the sideband.

The sideband may be calculated by the following formula.

$$fm = fs \times Z$$

$$fsb = fm \pm nfs = fs \times (Z \pm n)$$

Here, fm is an engagement frequency of the drive gear (Hz), fs is a rotation frequency of the drive gear (Hz), Z is the number of teeth of the drive gear, n is a natural number as a constant, and fsb is a frequency of the sideband (Hz).

From the above formula, it can be seen that the sideband is a function of the engagement frequency of the drive gear. Accordingly, the method of avoiding the overlapping of the gear engagement phases as described above to be applied with respect to the engagement frequency of the drive gear may be applied in order to reduce the sideband. However, the method of avoiding the overlapping of the gear engagement phases as described above may be applied to reduce the sidebands only if the number of driven gears engaged with the drive gear is three or more.

For example, in order to prevent the gear engagement phases from being overlapped for reducing the sidebands, three variables P, Q and R, and the installation angle may be considered.

P is a variable for determining the overlapping of the gear engagement phase in the gear engagement frequency, Q is a variable for determining the overlapping of the gear engagement phase of a first (+) sideband, and R is a variable for determining the overlapping of the gear engagement phase of a first (−) sideband.

The variables P, Q, and R are defined as follows.

$$P=Z/N, Q=(Z+1)/N, R=(Z-1)/N$$

Here, Z is the number of teeth of the drive gear, and N is the number of the plurality of driven gears.

For example, if the number of the driven gears is three and the drive gears are disposed at regular intervals, the installation angle of the three driven gears is 120 degrees.

At this time, if the number of teeth of the drive gear is ten, the three variables are P=10/3=3.3, Q=(10+1)/3=3.7, R=(10−1)/3=3. Therefore, the variables P and Q are not an integer, and the variable R is an integer. Accordingly, when the three driven gears are arranged at the regular interval of 120 degrees, if the number of teeth of the drive gear is ten, the gear engagement phase is not overlapped in the gear engagement frequency, and the gear engagement phase of the first (+) sideband is not overlapped. In other words, if Q=(Z+1)/N≠ an integer, the overlapping of the gear engagement phases of the first (+) sideband of the plurality of driven gears engaged with the drive gear may be avoided.

Also, if the number of teeth of the drive gear is eleven, the three variables are P=11/3=3.7, Q=(11+1)/3=4, R=(11−1)/3=3.3. Therefore, the variables P and R are not an integer, and the variable Q is an integer. Accordingly, when the three driven gears are arranged at the regular interval of 120 degrees, if the number of teeth of the drive gear is eleven, the gear engagement phase is not overlapped in the gear engagement frequency, and the gear engagement phase of the first (−) sideband is not overlapped. In other words, if R=(Z−1)/N≠ an integer, the overlapping of the gear engagement phases of the first (−) sideband of the plurality of driven gears engaged with the drive gear may be avoided.

As described above, when the number of the driven gears is three, it can be designed to avoid the overlapping of the gear engagement phase of the sideband of one direction. However, if the number of the driven gears is four or more, it can be designed to avoid the overlapping of the gear engagement phases of the sideband in both directions.

For example, if the number of the driven gears is four and the driven gears are disposed at regular intervals, the installation angle of the four driven gears is 90 degrees.

At this time, if the number of teeth of the drive gear is ten, the three variables are P=10/4=2.5, Q=(10+1)/4=2.75, R=(10−1)/4=2.25. Therefore, none of the variables P, Q, and R is an integer. Accordingly, when the four driven gears are arranged at the regular interval of 90 degrees, if the number of teeth of the drive gear is ten, the gear engagement phase is not overlapped in the gear engagement frequency, and the gear engagement phase of the first (+) sideband is not overlapped. Also, the gear engagement phase of the first (−) sideband is not overlapped. Accordingly, if Q=(Z+1)/N≠ an integer and R=(Z−1)/N≠ an integer are satisfied, the overlapping of the gear engagement phases of the first (+) sideband and the first (−) sideband of the plurality of driven gears engaged with the drive gear may be avoided.

Also, when the plurality of driven gears engaged with the drive gear cannot be arranged at regular intervals because of the space constraints in the power transmission apparatus, the installation angle ϕ between the pluralities of driven gears may be determined by the following formula.

$$\phi=360°/N\pm360°/Z$$

Here, ϕ is the installation angle between the driven gears, N is the number of the plurality of driven gears, and Z is the number of teeth of the drive gear.

For example, if the number of the driven gears is three and the number of teeth of the drive gear is ten, the three driven gears may be arranged as follows.

$$\phi=360°/3\pm360°/10=120°\pm36°=156°\text{ or }84°$$

Accordingly, the three driven gears may be arranged at intervals of 84°, 156°, and 122°.

At this time, the three variables P, Q, and R are 3.3, 3.7, and 3, respectively, so that the variables P and Q are not integers and the variable R is an integer. Accordingly, when the three driven gears are arranged at different intervals, if the number of teeth of the drive gear is ten, the gear engagement phase is not overlapped in the gear engagement frequency, and the gear engagement phase of the first (+) sideband is not overlapped. In other words, if Q=(Z+1)/N≠ an integer, the overlapping of the gear engagement phases of the first (+) sideband of the plurality of driven gears engaged with the drive gear may be avoided.

As another example, if the number of the driven gears is three and the number of teeth of the drive gear is eleven, the three driven gears may be arranged as follows.

$$\phi=360°/3\pm360°/11=120°\pm32.7°=152.7°\text{ or }87.3°$$

Accordingly, the three driven gears may be arranged at intervals of 87.3°, 152.7°, and 120°.

At this time, the three variables P, Q, and R are 3.7, 4, and 3.3, respectively, so that the variables P and R are not an integer and the variable Q is an integer. Accordingly, when the three driven gears are arranged at different intervals, if the number of teeth of the drive gear is eleven, the gear engagement phase is not overlapped in the gear engagement frequency, and the gear engagement phase of the first (−) sideband is not overlapped. In other words, if R=(Z−1)/N≠ an integer, the overlapping of the gear engagement phases of the first (−) sideband of the plurality of driven gears engaged with the drive gear may be avoided.

As described above, when the number of the driven gears is three and the three driven gears are arranged at different intervals, it can be designed to avoid the overlapping of the gear engagement phase of the sideband of one direction. However, if the number of the driven gears is four or more, it can be designed to avoid the overlapping of the gear engagement phases of the sideband in both directions.

For example, if the number of the driven gears is four and the number of teeth of the drive gear is ten, the four driven gears may be arranged as follows.

$$\phi=360°/4\pm360°/10=90°\pm36°=126°\text{ or }54°$$

Accordingly, the four driven gears may be arranged at intervals of 54°, 126°, 54°, and 126°.

At this time, the three variables P, Q, and R are 2.5, 2.75, and 2.25, respectively, so that none of the variables P, Q, and R is an integer. Accordingly, when the four driven gears are arranged at different intervals, if the number of teeth of the drive gear is ten, the gear engagement phase is not overlapped in the gear engagement frequency, and the gear engagement phase of the first (+) sideband is not overlapped. Also, the gear engagement phase of the first (−) sideband is not overlapped. Accordingly, if Q=(Z+1)/N≠ an integer and R=(Z−1)/N≠ an integer are satisfied, the overlapping of the gear engagement phases of the first (+) sideband and the first (−) sideband of the plurality of driven gears engaged with the drive gear may be avoided. In the above description, the number of teeth of the drive gear is ten; however, the number of teeth of the drive gear is not limited by this. The number of teeth of the drive gear may be determined arbitrarily as long as it can satisfy the above conditions.

As described above, the power transmission apparatus according to an embodiment of the present disclosure may avoid the overlapping of the gear engagement phases, thereby reducing vibration.

Also, if the power transmission apparatus according to an embodiment of the present disclosure is applied to an image forming apparatus, the image jitter as well as the vibration of the image forming apparatus may be reduced.

While the embodiments of the present disclosure have been described, additional variations and modifications of the embodiments may occur to those skilled in the art once they learn of the basic inventive concepts. Therefore, it is intended that the appended claims shall be construed to include both the above embodiments and all such variations and modifications that fall within the spirit and scope of the inventive concepts.

What is claimed is:

1. A power transmission apparatus comprising:
a drive gear disposed on a shaft of a motor;
a plurality of driven gears disposed to be engaged with the drive gear; and
a plurality of driven members configured to receive power from each of the plurality of driven gears,
wherein at least two of the plurality of driven gears are across from each other with an offset angle, which prevents centers of at least two of the plurality of driven gears from being 180° apart from each other with respect to a center of the drive gear, so that, when the at least two of the plurality of driven gears are engaged with the drive gear, a gear engagement phase of each of the at least two of the plurality of driven gears is different.

2. The power transmission apparatus of claim 1, wherein when $$P = \frac{\text{the number of teeth of drive gear }(Z)}{\text{the number of driven gears }(N)},$$

and
wherein the P is not equal to an integer.

3. The power transmission apparatus of claim 2,
wherein when an angle between the plurality of driven gears is equal to φ and the number of the plurality of driven gears is equal to N, $$\phi = 360°/N.$$

4. The power transmission apparatus of claim 3, wherein when $$Q = \frac{(Z+1)}{n}, \text{ and } R = \frac{(Z-1)}{N},$$

the N is equal to three and the Q and R are not integers.

5. The power transmission apparatus of claim 3, wherein when $$Q = \frac{(Z+1)}{n}, \text{ and } R = \frac{(Z-1)}{N},$$

the N is equal to three and R is not an integer.

6. The power transmission apparatus of claim 3, wherein when $$Q = \frac{(Z+1)}{n}, \text{ and } R = \frac{(Z-1)}{N},$$

the N is equal to four or more and the Q and R are not integers.

7. The power transmission apparatus of claim 2, wherein a phase of a first gear of the plurality of driven gears is not equal to zero degrees.

8. The power transmission apparatus of claim 1, wherein when $$Q = \frac{(Z+1)}{n}, \text{ and } R = \frac{(Z-1)}{N},$$

the N is equal to three and the Q is not an integer.

9. The power transmission apparatus of claim 1, wherein when $$Q = \frac{(Z+1)}{n}, \text{ and } R = \frac{(Z-1)}{N},$$

the N is equal to three and the R is not an integer.

10. The power transmission apparatus of claim 1, wherein when $$Q = \frac{(Z+1)}{n}, \text{ and } R = \frac{(Z-1)}{N},$$

if the N is equal to four or more, the Q and R are not an integer.

11. The power transmission apparatus of claim 1, wherein the plurality of driven gears are disposed at different intervals.

12. The power transmission apparatus of claim 1, wherein the power transmission apparatus is used in an image forming apparatus, and the plurality of driven gears comprises a photosensitive drum gear and a pickup gear.

13. The power transmission apparatus of claim 12, wherein the plurality of driven members comprises a photosensitive drum and a pickup roller.

14. The power transmission apparatus of claim 1, wherein when an angle between the at least two of the plurality of driven gears is equal to φ, a number of the plurality of driven gears is equal to N, and a number of teeth on the drive gear is equal to Z, $$\phi = 360°/N*[1 \text{ to } Z] - 360°/(Z*N), \text{ and}$$

wherein [1 to Z] is an integer between 1 and Z and φ is not equal to 180°.

15. The power transmission apparatus of claim 14, wherein N, which is the plurality of driven gears, is equal to 2.

16. A method of power transmission, comprising:
disposing a drive gear on a shaft of a motor;
engaging a plurality of driven gears with the drive gear;
receiving power from each of the plurality of driven gears by a plurality of driven members; and
arranging at least two of the plurality of driven gears across from each other with an offset angle between the two of the plurality of driven gears which prevents centers of at least two of the plurality of driven gears from being 180° apart from each other with respect to a center of the drive gear, so that, when the plurality of driven gears are engaged with the drive gear, a gear engagement phase of each of the at least two of the plurality of driven gears is different.

17. A power transmission apparatus comprising:
a drive gear disposed on a shaft of a motor;
a plurality of driven gears disposed to be engaged with the drive gear; and
a plurality of driven members configured to receive power from each of the plurality of driven gears,
wherein at least two of the plurality of driven gears are across from each other with an offset angle so that, when the plurality of driven gears are engaged with the drive gear, a gear engagement phase of each of the plurality of driven gears is different, and
wherein the offset angle of the at least two of the plurality of driven gears prevents the at least two of the plurality of driven gears from being 180° apart from each other.

18. The power transmission apparatus of claim 17, wherein when an angle between two of the at least two of the plurality of driven gears is equal to φ, a number of the plurality of driven gears is equal to N, and a number of teeth on the drive gear is equal to Z, $$\phi = 360°/N*[1 \text{ to } Z] - 360°/(Z*N),$$

wherein [1 to Z] is an integer between 1 and Z and φ is not equal to 180°.

19. The power transmission apparatus of claim 18, wherein N, which is the plurality of driven gears, is equal to 2.

* * * * *